(12) United States Patent
Davydychev et al.

(10) Patent No.: US 10,073,189 B2
(45) Date of Patent: Sep. 11, 2018

(54) INVERSION-BASED CALIBRATION OF DOWNHOLE ELECTROMAGNETIC TOOLS

(71) Applicant: Schlumberger Technology Corporation, Sugar Land, TX (US)

(72) Inventors: Andrei I. Davydychev, Sugar Land, TX (US); Michael Thiel, Cambridge, MA (US); Dzevat Omeragic, Lexington, MA (US); Steve F. Crary, Sugar Land, TX (US)

(73) Assignee: SCHLUMBERGER TECHNOLOGY CORPORATION, Sugar Land, TX (US)

( * ) Notice: Subject to any disclaimer, the term of this patent is extended or adjusted under 35 U.S.C. 154(b) by 71 days.

(21) Appl. No.: 14/379,476

(22) PCT Filed: Feb. 15, 2013

(86) PCT No.: PCT/US2013/026289
§ 371 (c)(1),
(2) Date: Aug. 18, 2014

(87) PCT Pub. No.: WO2013/123293
PCT Pub. Date: Aug. 22, 2013

(65) Prior Publication Data
US 2015/0301222 A1    Oct. 22, 2015

Related U.S. Application Data

(60) Provisional application No. 61/600,464, filed on Feb. 17, 2012.

(51) Int. Cl.
*G01V 13/00* (2006.01)
*G01V 3/28* (2006.01)
*G01V 3/30* (2006.01)

(52) U.S. Cl.
CPC ............. *G01V 13/00* (2013.01); *G01V 3/28* (2013.01); *G01V 3/30* (2013.01)

(58) Field of Classification Search
CPC ............. G01V 13/00; G01V 3/30; G01V 3/28
USPC ................................................ 324/333–338
See application file for complete search history.

(56) References Cited

U.S. PATENT DOCUMENTS

| 4,412,207 A | 10/1983 | Sinclair |
| 4,800,496 A | 1/1989 | Barber et al. |
| 5,001,675 A | 3/1991 | Woodward |
| 7,027,923 B2 | 4/2006 | Barber et al. |

(Continued)

FOREIGN PATENT DOCUMENTS

| CN | 101454690 A | 6/2009 |
| CN | 101918863 A | 12/2010 |
| CN | 101932955 A | 12/2010 |

OTHER PUBLICATIONS

International Search Report for International Application No. PCT/US2013/026289 dated Jun. 13, 2013.

(Continued)

*Primary Examiner* — Jay Patidar

(57) ABSTRACT

An inversion based calibration method for downhole electromagnetic tools includes processing an inversion of a formation model using acquired electromagnetic measurement data to obtain formation parameters and calibration parameters for at least one measurement array.

13 Claims, 11 Drawing Sheets

(56) References Cited

U.S. PATENT DOCUMENTS

| | | |
|---|---|---|
| 8,831,885 B2* | 9/2014 | Lan ............... G01N 24/081 |
| | | 702/11 |
| 2006/0017442 A1 | 1/2006 | Folberth |
| 2009/0164125 A1* | 6/2009 | Bordakov ............ E21B 47/04 |
| | | 702/6 |
| 2009/0237084 A1 | 9/2009 | Itskovich et al. |
| 2010/0097065 A1 | 4/2010 | Itskovich et al. |
| 2010/0125439 A1 | 5/2010 | Reiderman et al. |
| 2011/0074427 A1 | 3/2011 | Wang et al. |
| 2011/0133740 A1 | 6/2011 | Seydoux et al. |
| 2011/0238312 A1 | 9/2011 | Seydoux et al. |

OTHER PUBLICATIONS

First Office Action issued in related CN application 201380014777.7 dated May 20, 2016, 16 pages.

Barber, et al., "Real-Time Openhole Evaluation", 1999, Oilfield Review, Retrieved from Internet: https://www.sib.com/~media/Files/resources/oilfield_review/ors99/sum99/real-time.pdf, 22 pages.

European Search Report issued in related EP application 13748628.8 dated Jun. 24, 2015, 4 pages.

Extended European Search Report issued in related EP application 13748628.8 dated Sep. 1, 2015, 5 pages.

Second Office Action issued in corresponding Chinese application 201380014777.7 dated Dec. 30, 2016. 20 pages.

Die et al., Study on Adaptive Borehole Correction for Array Induction Logging Signals, [English Translation of Abstract provided] Basic Sciences in China Master's Theses Full-text Database, Dec. 15, 2011, No. S1, pp. A011-A175.

* cited by examiner

US 10,073,189 B2

INVERSION-BASED CALIBRATION OF DOWNHOLE ELECTROMAGNETIC TOOLS

FIELD OF THE INVENTION

Disclosed embodiments relate generally to calibration methods for downhole electromagnetic measurement tools and more particularly to inversion-based methods for calibrating downhole electromagnetic measurement tools.

BACKGROUND INFORMATION

The use of electromagnetic measurements in prior art downhole applications, such as logging while drilling (LWD) and wireline logging applications is well known. Such techniques may be utilized to determine a subterranean formation resistivity, which, along with formation porosity measurements, is often used to indicate the presence of hydrocarbons in the formation. Moreover, azimuthally sensitive directional resistivity measurements are commonly employed, e.g., in pay-zone steering applications, to provide information upon which steering decisions may be made. Directional resistivity tools often make use of tilted or transverse antennas (antennas that have a magnetic dipole that is tilted or transverse with respect to the tool axis).

Tool calibration is an important and necessary task in electromagnetic logging operations. Factors such as imperfections in tool construction and variations due to tool electronics can introduce significant measurement errors. The intent of tool calibration is to eliminate and/or compensate for the effects of these factors on the measurement data. Various tool compensation methods are known. For example, air calibration methods are commonly employed. In such methods, an electromagnetic resistivity tool may be suspended (e.g. via crane) in air away from any conducting media. A resistivity measurement should yield near-infinite resistivity (i.e., a conductivity of zero). Any deviation is subtracted and is assumed to be related to systematic measurement errors (e.g., related to the electronics, hardware, or processing methods). U.S. Pat. Nos. 4,800,496 and 7,027,923 disclose methods for determining a sonde error in induction or propagation logging tools that require measurements to be made at two or more heights above the surface of the earth.

While the aforementioned calibration methods may provide an adequate calibration for conventional electromagnetic logging tools, they can be difficult to implement with deep reading, directional electromagnetic resistivity tools (look-around tools) or electromagnetic look-ahead tools. As described in more detail below, the transmitter and receiver subs in such deep reading tools are modular such that neither the axial spacing nor the azimuthal alignment angle between the subs are fixed. Hence a calibration performed for one tool configuration will not necessarily be valid for any other tool configuration. Moreover, performing a conventional air calibration tends to be difficult if not impossible to implement at a drilling site owing to the long spacing between transmitter and receiver subs (e.g., up to 100 feet or more) and the need to suspend the entire BHA. Therefore, there remains a need in the art for an improved system for calibrating directional resistivity logging tools.

SUMMARY

An inversion-based calibration method for downhole electromagnetic tools is disclosed. Electromagnetic data are acquired in a subterranean borehole using a least one measurement array (e.g., at least one transmitter receiver pair). An inversion of a formation model (also referred to in the art as a forward model) is processed to obtain formation parameters and at least one calibration parameter for the measurement array. The calibration parameter for the measurement array may then be fixed and the inversion processed again to obtain formation parameters and at least one calibration parameter for a second measurement array. This procedure may be repeated recursively for substantially any number of measurement arrays.

The disclosed embodiments may provide various technical advantages. For example, the disclosed embodiments provide a viable calibration methodology for modular deep reading and/or look ahead electromagnetic measurement tools. The disclosed methods may further advantageously be applied to substantially any electromagnetic measurement system. Moreover, the measurement tools may be advantageously recalibrated at substantially any time during an electromagnetic logging operation without removing the tool from the subterranean environment. Such re-calibration may be useful, for example, if the average level of resistivity changes, e.g., when the tool enters the highly-resistive area in which the higher-frequency measurements become more sensitive.

This summary is provided to introduce a selection of concepts that are further described below in the detailed description. This summary is not intended to identify key or essential features of the claimed subject matter, nor is it intended to be used as an aid in limiting the scope of the claimed subject matter.

BRIEF DESCRIPTION OF THE DRAWINGS

For a more complete understanding of the disclosed subject matter, and advantages thereof, reference is now made to the following descriptions taken in conjunction with the accompanying drawings, in which.

DETAILED DESCRIPTION

Figure 1:
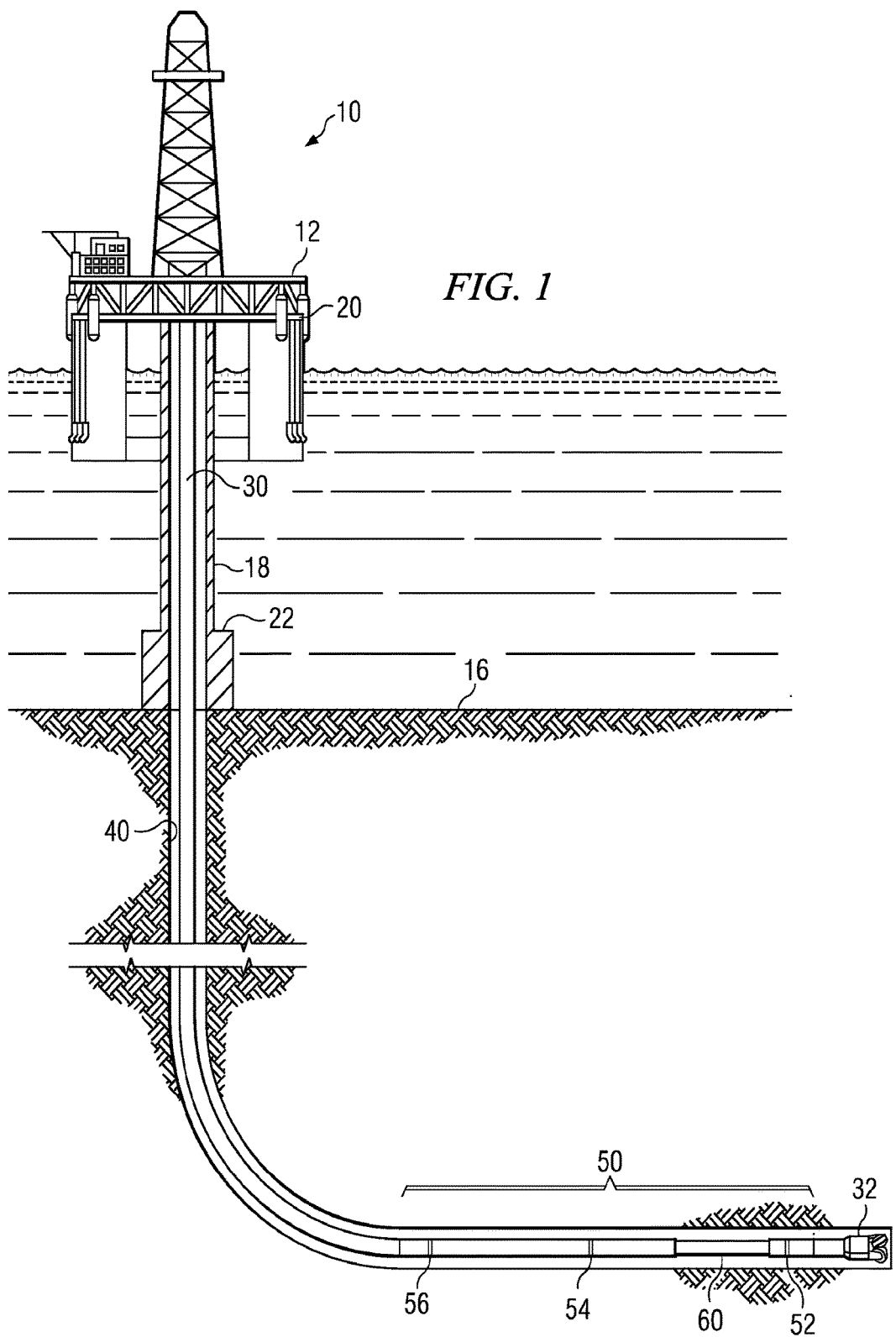
FIG. 1 depicts one example of a rig on which disclosed tool and method embodiments may be utilized.
Figure 2A:
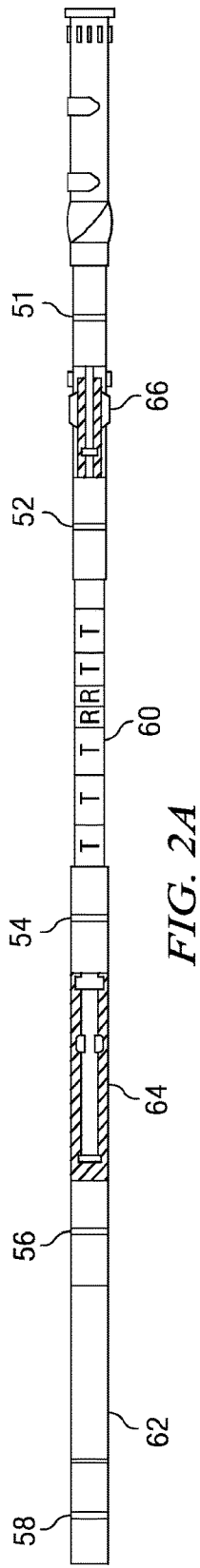
FIG. 2A further depicts the deep reading resistivity tool configuration shown on FIG. 1.

FIG. 1 depicts an example drilling rig 10 suitable for employing various method embodiments disclosed herein. A semisubmersible drilling platform 12 is positioned over an oil or gas formation (not shown) disposed below the sea floor 16. A subsea conduit 18 extends from deck 20 of platform 12 to a wellhead installation 22. The platform may include a derrick and a hoisting apparatus for raising and lowering a drill string 30, which, as shown, extends into borehole 40 and includes a drill bit 32 deployed at the lower end of a bottom hole assembly (BHA) that further includes a modular electromagnetic measurement tool 50 suitable for making deep reading resistivity measurements. In the depicted embodiment, the modular electromagnetic measurement tool 50 includes a conventional electromagnetic logging tool 60 (e.g., an induction/propagation logging tool) and several electromagnetic measurement modules (subs) 52, 54, and 56 deployed in the BHA. Example tool configurations are described in more detail below with respect to FIGS. 2A and 2B.

It will be understood that the deployment illustrated on FIG. 1 is merely an example. Drill string 30 may include substantially any suitable downhole tool components, for example, including a steering tool such as a rotary steerable tool, a downhole telemetry system, and one or more measure-while-drilling (MWD) or logging-while-drilling (LWD) tools including various sensors for sensing downhole characteristics of the borehole and the surrounding formation. Moreover, as described in more detail below, measurement modules 52, 54, and 56 may be interspersed between various ones of such downhole tools (e.g., between a steering tool and an MWD tool). The disclosed embodiments are by no means limited in these regards.

It will be further understood that disclosed embodiments are not limited to use with a semisubmersible platform 12 as illustrated on FIG. 1. The disclosed embodiments are equally well suited for use with either onshore or offshore subterranean operations. Moreover, it will be appreciated that the terms borehole and wellbore are used interchangeably herein.

FIG. 2 depicts one example of a deep reading electromagnetic measurement tool 50. As described in U.S. Patent Publication 2011/0133740 (which is fully incorporated by reference herein), modular tool configurations may be used to obtain deep reading resistivity data. Such modular designs allow the transmitter and receiver antennas to be placed at various locations within a BHA, or at locations in the drill string above the BHA. For example, in the tool configuration shown on FIG. 2 the BHA may include four receiver modules 52, 54, 56, and 58 and one transmitter module 51 deployed in the drill string among other downhole tools 60, 62, 64, and 66. In the depicted embodiment downhole tool 60 includes an electromagnetic logging while drilling tool used to evaluate formation resistivity, resistivity anisotropy, and dip. Tools 62, 64, and 66 may include other LWD tools, MWD tools, and the like. By inserting transmitter and/or receiver modules at different locations on a standard BHA, as shown in FIG. 2, or a drill string, specific depths of investigation can be implemented to improve the formation model inversion process used to process such deep resistivity measurements. For example, in one embodiment, transmitter module 56 may be about 100 feet from transmitter module 51.

It will be understood that modules 51, 52, 54, 56, and 58 may include one or more transmitting antennas, receiving antennas, or transceiver antennas. In such transceiver embodiments, the antennas are not designed as separate transmitters or receivers. Instead, the same antenna may function as either a transmitter or a receiver. Such enhancement, besides being economically advantageous, allows more depth of investigation for the same number of transceiver modules.

Directional electromagnetic logging tools commonly use axial, transverse, and/or tilted antennas. An axial antenna is one whose dipole moment is substantially parallel with the longitudinal axis of the tool. Axial antennas are commonly wound about the circumference of the logging tool such that the plane of the antenna is orthogonal to the tool axis. Axial antennas produce a radiation pattern that is equivalent to a dipole along the axis of the tool (by convention the z direction). A transverse antenna is one whose dipole moment is substantially perpendicular to the longitudinal axis of the tool. A transverse antenna may include a saddle coil (e.g., as disclosed in U.S. Patent Publications 2011/0074427 and 2011/0238312) and generate a radiation pattern that is equivalent to a dipole that is perpendicular to the axis of the tool (by convention the x or y direction). A tilted antenna is one whose dipole moment is neither parallel nor perpendicular to the longitudinal axis of the tool. Tilted antennas are well known in the art and commonly generate a mixed mode radiation pattern (i.e., a radiation pattern in which the dipole moment is neither parallel nor perpendicular with the tool axis).

Triaxial antenna sensor arrangements are also commonly utilized. A triaxial antenna arrangement (also referred to as a triaxial transmitter, receiver, or transceiver) is one in which two or three antennas (i.e., up to three distinct antenna coils) are arranged to be mutually independent. By mutually independent it is meant that the dipole moment of any one of the antennas does not lie in the plane formed by the dipole moments of the other antennas. Three tilted antennae is one common example of a triaxial antenna sensor. Three collocated orthogonal antennas, with one antenna axial and the other two transverse, is another common example of a triaxial antenna sensor. While certain antenna configurations have been described herein, it will be understood that the disclosed embodiments are not limited to any particular antenna configuration.

Figures 2B, 4:
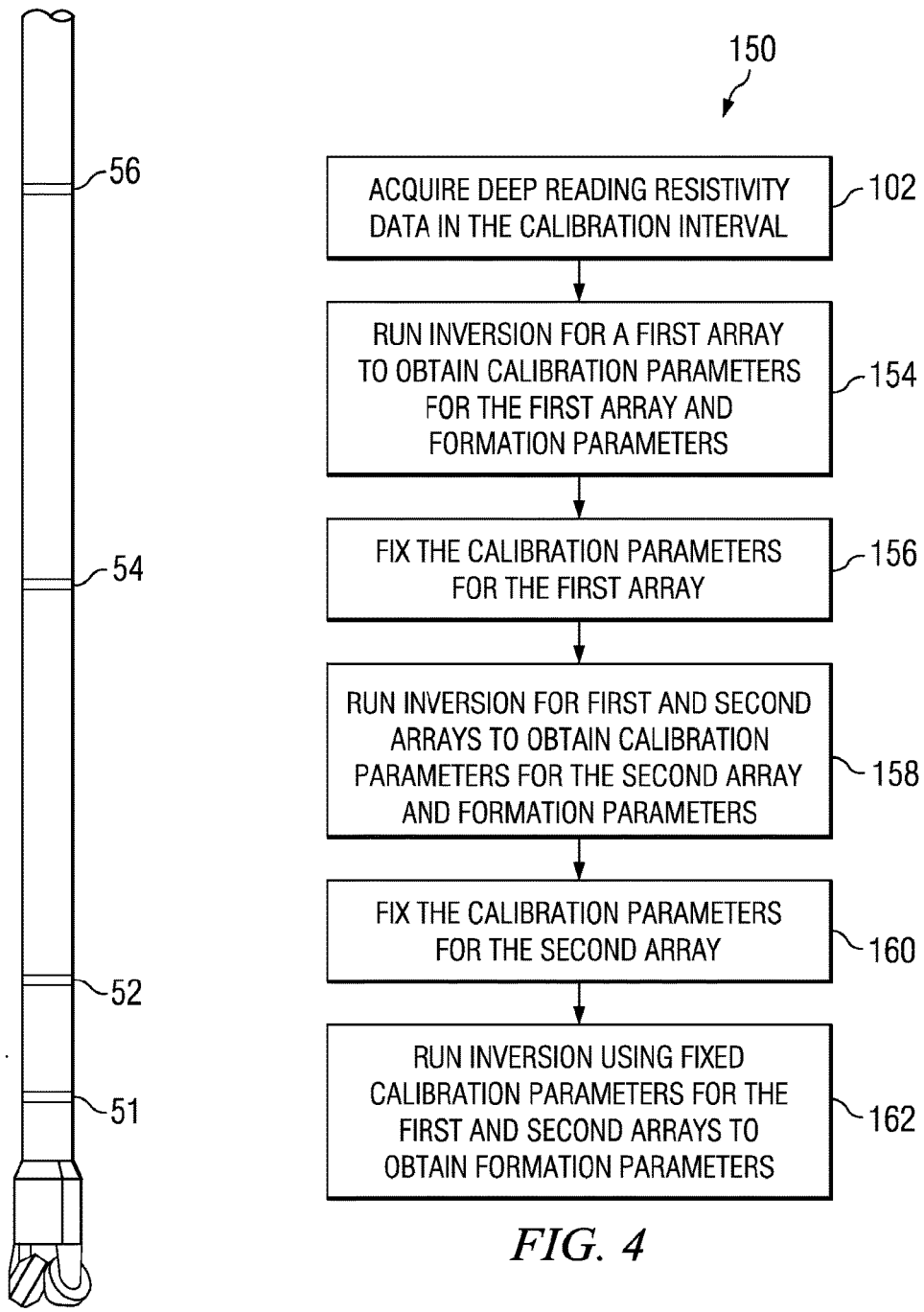
FIG. 2B depicts a look ahead resistivity tool configuration.
FIG. 4 depicts a flow chart of another disclosed method embodiment.

FIG. 2B an alternative electromagnetic measurement tool embodiment for making look-ahead directional resistivity measurements. The depicted embodiment is similar to that shown on FIG. 2A in that it includes electromagnetic measurement modules 51, 52, 54, and 56. While disclosed embodiments are in no way limited in this regard, the depicted embodiment may include BHA may include first, second, and third receiver modules 52, 54, and 56 and transmitter module 51 deployed in the BHA. Those of skill in the art will readily appreciate that locating the transmitter near the drill bit tends to facilitate the look-ahead electromagnetic measurements.

Owing to the modular nature of the deep reading resistivity tools described above with respect to FIGS. 2A and 2B, neither the axial spacing nor the azimuthal alignment angle between the various antenna modules are fixed from one logging operation to the next. Thus any tool calibration is typically only valid for a particular tool/BHA configuration. In other words a calibration for any particular tool configuration (e.g., the configurations shown on FIGS. 2A and 2B) is only valid for that particular tool configuration and is generally not valid for any other configuration. As a result, modular deep reading resistivity tools generally need calibration prior to every logging operation (i.e., after the BHA is made up with the various antenna modules thereby fixing the antenna spacings for that operation). Such calibration requirements tend to be excessively burdensome using prior art calibration techniques.

Figure 3:
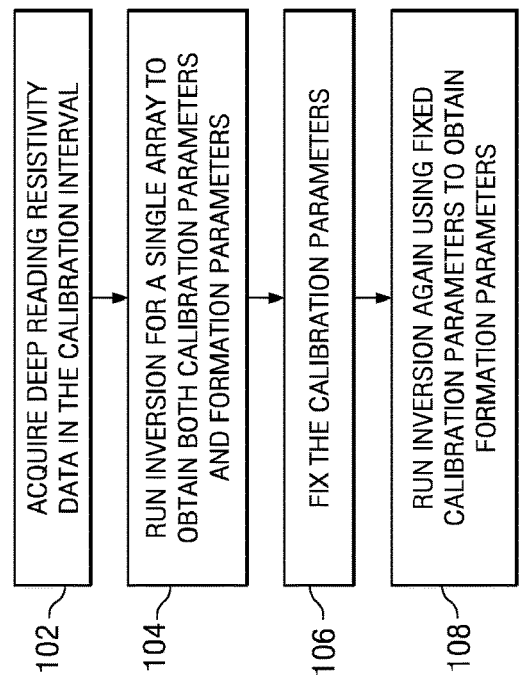
FIG. 3 depicts a flow chart of one disclosed method embodiment.

FIG. 3 depicts a flow chart of one disclosed method embodiment 100. A drill string including an electromagnetic measurement tool (e.g., including a modular deep reading resistivity tool or a look ahead resistivity tool as depicted on FIGS. 2A and 2B) is deployed in a subterranean wellbore. Resistivity data (such as deep reading or look ahead resistivity data) are acquired at 102 in at least a calibration interval of the wellbore (e.g., in a preselected region of the wellbore). The calibration interval may be preselected based on any number of factors, for example, including operator convenience and/or previously characterized electrical properties of the formation. It may be advantageous to a select a calibration interval having a near constant resistivity (i.e., being substantially free of contrast boundaries) so as to simplify the formation model and reduce the number of inversion parameters used in the model. In addition, to reduce uncertainty due to tool bending and change in inclination of transmitter and receiver subs, it may further be advantageous to perform calibration on a straight trajectory interval. A region of high resistivity may also be advantageous so as to minimize the formation response as compared to the calibration parameters in the subsequent inversion. Moreover, for drilling operator convenience it may be desirable to select a calibration interval at the beginning of a well placement or logging job prior to approaching the region of interest from which the resistivity data are to be acquired.

As described in more detail below, the acquired data includes sensor data from at least a first measurement array (i.e., a transmitter having at least one transmitting antenna spaced apart from a receiver having at least one receiving antenna). The acquired data may include substantially any coupling in the voltage tensor. For example, when using directional transmitter and receiver arrangements, the acquired data may include selected couplings from the following voltage tensor:

$$V = \begin{pmatrix} V_{xx} & V_{xy} & V_{xz} \\ V_{yx} & V_{yy} & V_{yz} \\ V_{zx} & V_{zy} & V_{zz} \end{pmatrix}$$

wherein the first index (x, y, or z) refers to the transmitter dipole and the second index refers to the receiver dipole. By convention, the x and y indices refer to transverse moments while the z index refers to an axial moment. The disclosed embodiments are of course not limited to any particular conventions. Nor are they limited to using purely axial or purely transverse transmitter and/or receiver antennas.

The acquired data may also include various measurements that are derived from the antenna couplings. These measurements may include, for example, symmetrized directional amplitude and phase (USDA and USDP), anti-symmetrized directional amplitude and phase (UADA and UADP), harmonic resistivity amplitude and phase (UHRA and UHRP) and harmonic anisotropy amplitude and phase (UHAA and UHAP). These parameters are known to those of ordinary skill in the art and may be derived from the antenna couplings, for example, as follows:

$$USDA = 20 \log_{10}\left(\frac{V_{zz} - V_{zx}}{V_{zz} + V_{zx}} \cdot \frac{V_{zz} + V_{xz}}{V_{zz} - V_{xz}}\right)$$

$$USDP = -\text{angle}\left(\frac{V_{zz} - V_{zx}}{V_{zz} + V_{zx}} \cdot \frac{V_{zz} + V_{xz}}{V_{zz} - V_{xz}}\right)$$

$$UADA = 20 \log_{10}\left(\frac{V_{zz} - V_{zx}}{V_{zz} + V_{zx}} \cdot \frac{V_{zz} - V_{xz}}{V_{zz} + V_{xz}}\right)$$

$$UADP = -\text{angle}\left(\frac{V_{zz} - V_{zx}}{V_{zz} + V_{zx}} \cdot \frac{V_{zz} - V_{xz}}{V_{zz} + V_{xz}}\right)$$

$$UHRA = 20 \log_{10}\left(\frac{-2V_{zz}}{V_{xx} + V_{yy}}\right)$$

$$UHRP = -\text{angle}\left(\frac{-2V_{zz}}{V_{xx} + V_{yy}}\right)$$

$$UHAA = 20 \log_{10}\left(\frac{V_{xx}}{V_{yy}}\right)$$

$$UHAP = -\text{angle}\left(\frac{V_{xx}}{V_{yy}}\right)$$

Note that the above list is by no means exhaustive and that other derived parameters may be acquired at 102. Note also that with the exception of UHRA and UHRP, the measurements include cross coupling components (e.g., $V_{xz}$ and $V_{zx}$). Since there is minimal cross coupling in homogeneous media, USDA, USDP, UHAA, UHAP, UADA, and UADP reduce to zero (or near zero) in the absence of boundary layers or other heterogeneities.

With continued reference to FIG. 3, a mathematical inversion is processed for data collected from a single measurement array at 104 and is used to obtain calibration parameters for the measurement array and various formation parameters (the particular formation parameters depending on the configuration of the formation model). The obtained calibration parameters may be fixed in the formation model at 106 and the inversion is processed again at 108 using the fixed calibration parameters for the first measurement array to obtain the various formation parameters. At 108 the inversion may be processed for logging data acquired over the entire logging interval to obtain the formation parameters (as the calibration parameters have been fixed at 106).

FIG. 4 depicts a flow chart of another disclosed method embodiment 150. As with method 100, deep reading resistivity data are acquired in the calibration interval at 102. The deep reading resistivity data may be collected at substantially any suitable number of measurement arrays (e.g., using multiple pairs of transmitter/receiver modules in the tool embodiment depicted on FIG. 2—each transmitter/receiver module including at least one antenna). Moreover, shallow reading resistivity data may also be acquired (e.g., using electromagnetic logging tool 60 shown on FIG. 2). An inversion is processed at 154 for the data acquired by the first measurement array to obtain calibration parameters for both the first measurement array and various formation parameters. The obtained calibration parameters may be fixed at 156 and the inversion processed again at 158 for the data acquired by the first and second measurement arrays (e.g., by the first and second pairs of modules having corresponding first and second axial spacings along the BHA) to obtain calibration parameters for the second measurement array and the various formation parameters. In the illustrated embodiment, the first measurement array may have a shorter axial spacing relative to the axial spacing of second measurement array (e.g., the first measurement array may have a "short spacing" and the second measurement array may have a "long spacing"). The obtained calibration parameters for the second measurement array may then fixed at 160 and the inversion may processed again at 162 using the fixed calibration parameters for the first and second measurement arrays to obtain the various formation parameters. At 162 the inversion may be processed for logging data acquired over the entire logging interval to obtain the formation parameters (as the calibration parameters have been fixed at 160).

In embodiments in which a tool configuration including three or more measurement arrays is utilized, the above process may be repeated recursively. For example, when a third measurement array is used, the inversion may be processed again for the data acquired at the first, second, and third measurement arrays to obtain calibration parameters for the third measurement array and the various formation parameters. The obtained calibration parameters for the third measurement array may then be fixed. Fourth, fifth, and any subsequent measurement arrays (correspondingly spaced along the axis of the BHA) may be calibrated recursively in the same manner. In such operations involving multiple calibrations, it may be advantageous to begin with the short spacing measurement arrays and work upwards to the longer spacing arrays.

Those of ordinary skill in the art will readily appreciate that inversion is a mathematical process by which data (in this particular case electromagnetic logging data) are used to generate a formation model or to obtain model parameters that are consistent with the data. In a conventional inversion process a formation model is provided that includes various formation parameters such as the resistivity profile of the formation crossed by the tool, distances to one or more boundary layers, resistivity of one or more remote beds, vertical and horizontal resistivity of various beds, an anisotropy ratio, boundary layer dip angle, and the like. A relatively simple formation model may include, for example, a near bed resistivity, a remote bed resistivity, and a distance to the boundary between the near and far beds. More complex formation models may include three or more beds, vertical and horizontal resistivity values for each of the beds, and dip angles between the formation boundaries and the axis of the logging tool. Moreover, the beds may be ahead of the bit (e.g., in a look ahead logging operation) or adjacent to the logging tool (in a look around logging operation). Processing the inversion is the computerized process by which the calibration parameter values (or shifts) and the formation parameter values are obtained so as to mathematically fit the measured data (e.g., the voltage tensor or the USDA, USDP, UHAA, UHAP, UHRA, UHRP, UHRA, and UHRP values described above) with minimal error (or error within preselected tolerances).

In disclosed method embodiments 100 and 150, the formation model is configured so as to further include calibration parameters for selected measurement arrays. The calibration parameters may include, for example, calibration parameters (or shifts) for UHRA and UHRP. The calibration parameters may alternatively/additionally include real and imaginary components of the harmonic resistivity (or other resistivity parameters). Moreover, the calibration parameters may include calibration parameters (or shifts) for certain ones of the aforementioned voltage measurements (e.g., $V_{xx}$, $V_{yy}$, and/or $V_{zz}$). The disclosed embodiments are not limited in this regard. In embodiments in which electromagnetic measurements are made at multiple frequencies, the calibration parameters may include one or more parameters (e.g., a UHRA and a UHRP shift) for each frequency. Thus in one non-limiting example in which six frequencies are utilized for a given transmitter receiver pair, there may be a total of twelve unknown calibration parameters in the inversion (six UHRA and six UHRP shifts). Again, the disclosed embodiments are not limited to any particular number of frequencies.

It will be understood that the disclosed embodiments are not limited to any particular formation model. Nor are the disclosed embodiments limited to any particular mathematical techniques for processing the inversion. Rather, substantially any suitable algorithmic means may be used to obtain values for the calibration parameters and the formation parameters and to minimize the error between the measured tool responses and the formation modelled responses. Those of ordinary skill will readily be able to implement various mathematical inversion techniques, for example, including deterministic Gauss-Newton inversion and stochastic Monte-Carlo inversion methods.

While the disclosed embodiments are not limited to any particular formation model, it may be advantageous to select a calibration interval in which the formation has substantially homogeneous electrical properties (in which there are no boundaries). The absence of boundaries and other heterogeneities tends to significantly reduce the number of formation parameters in the formation model and therefore tends to simplify and improve the calibration parameters determined by the inversion. Moreover, it may be further advantageous to select a high resistivity region such that the tool response is similar to that of an air calibration. However, the disclosed embodiments are not limited in these regards.

Figure 5A:
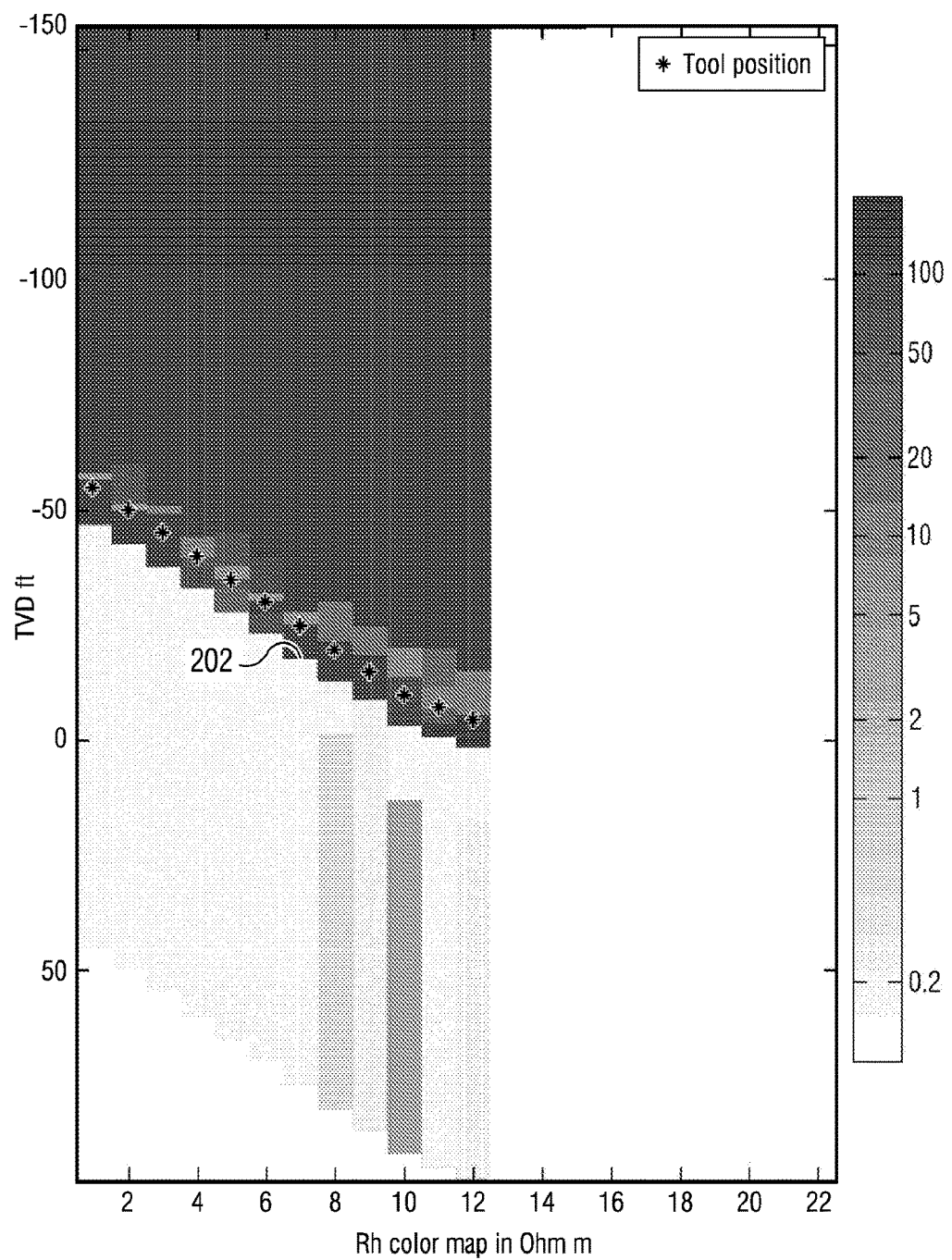
FIGS. 5A, 5B, and 5C depict resistivity maps for an experimental test in which a deep reading look-ahead resistivity tool is suspended vertically above the surface of the earth. A first control is depicted on FIG. 5A in which no calibration shifts were used in the inversion, a second control on FIG. 5B in which upper point values were used to compute approximate air calibration shifts, and a comparison on FIG. 5C in which the calibration shifts were computed using the calibration inversion methods depicted on FIGS. 3 and 4.
Figure 5B:
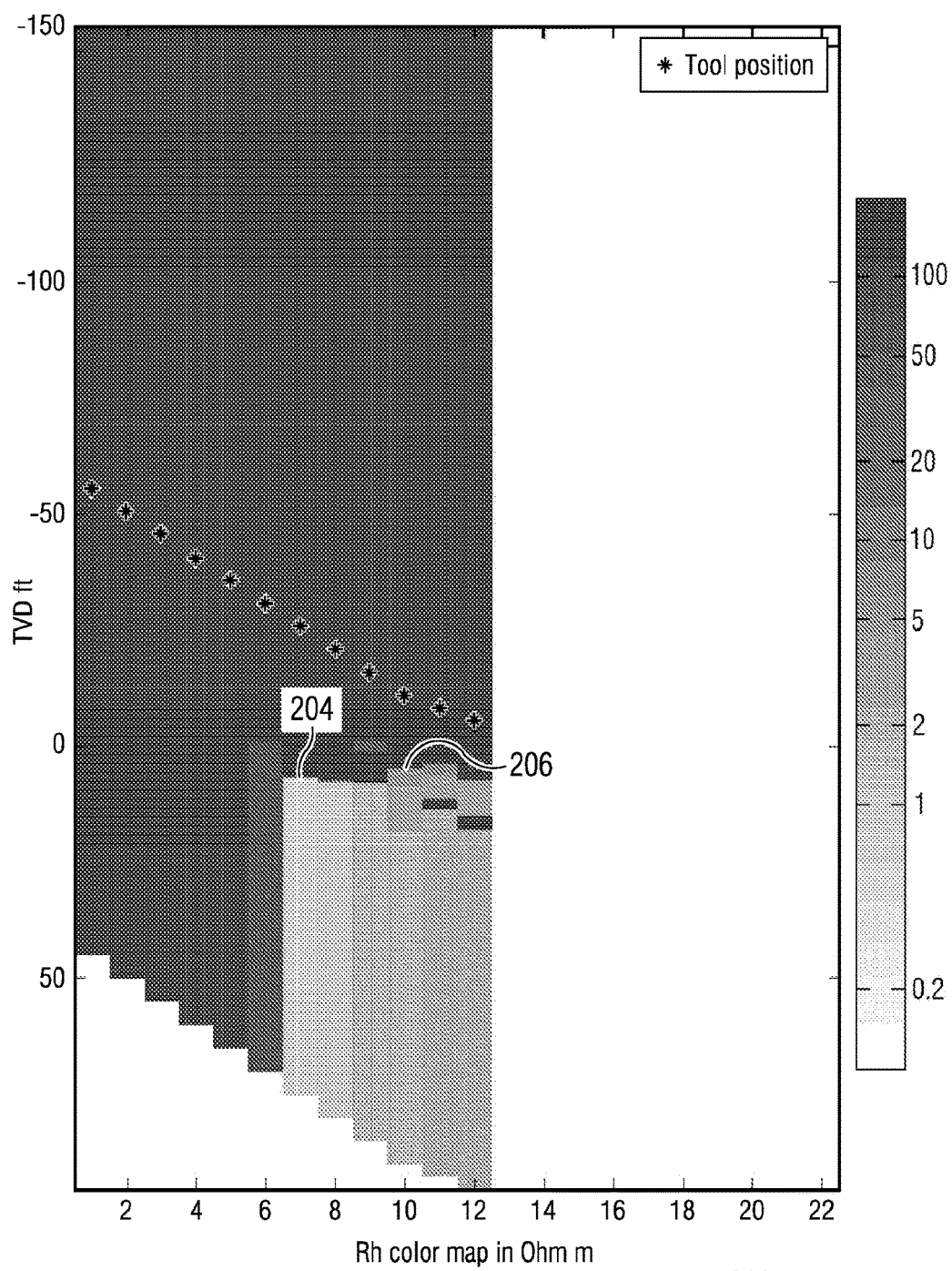
Figure 5C:
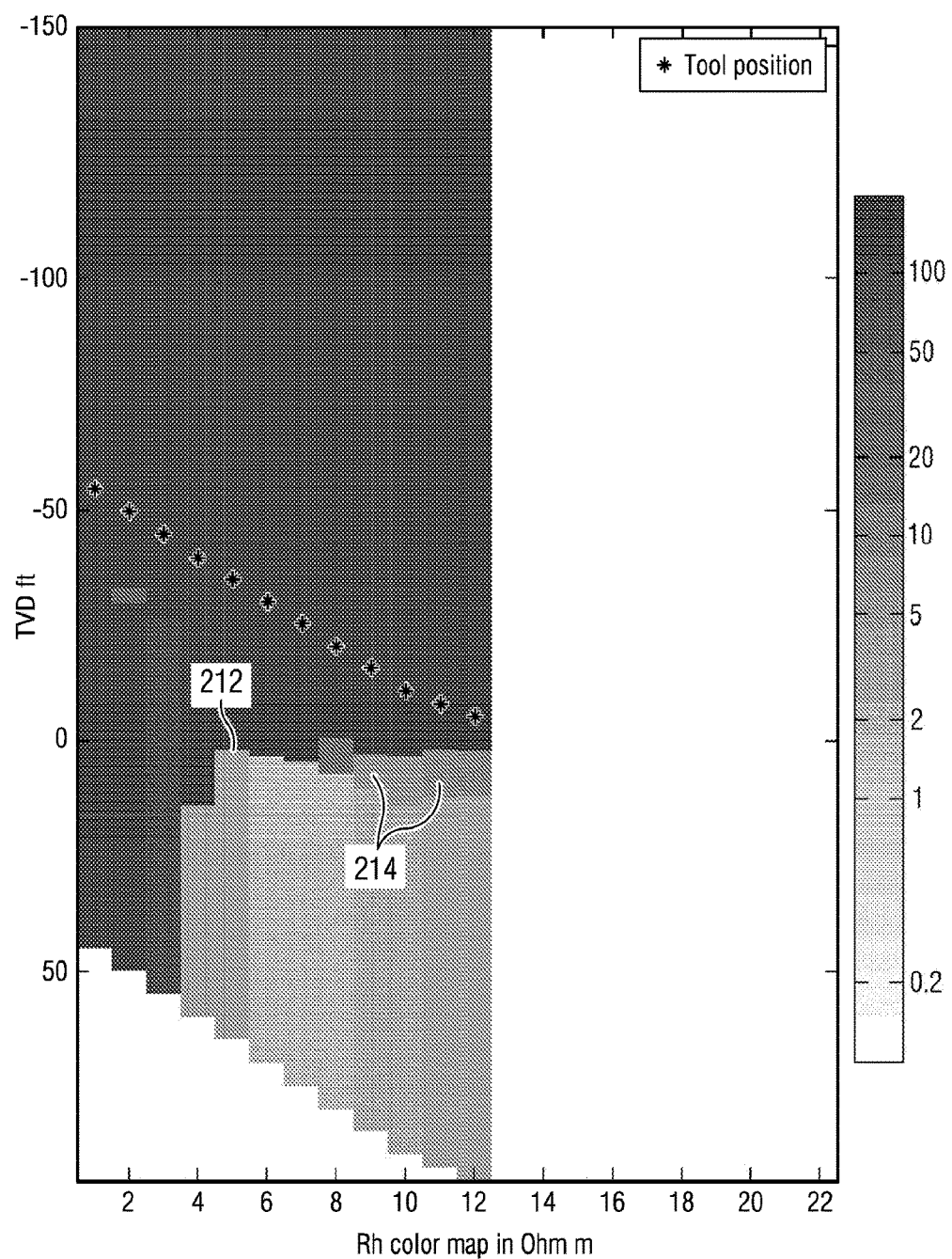

The disclosed embodiments are now described in further detail with respect to the following non-limiting examples. FIGS. 5A, 5B, and 5C depict resistivity maps for an experimental test in which a deep reading look-ahead resistivity tool is suspended (e.g., using a crane) vertically above the surface of the earth. Such resistivity maps are described in more detail in U.S. patent application Ser. No. 13/312,205. A number of measurements were taken as a measurement tool similar to that depicted on FIG. 2B was lowered towards the surface of the earth. The resistivity maps depicted on FIGS. 5A, 5B, and 5C include a first control (5A) in which no calibration shifts were used in the inversion, a second control (5B) in which the upper point values were used to compute approximate "air" calibration shifts, and a comparison (5C) in which the calibration shifts were computed using inversion based calibration methods described above with reference to FIGS. 3 and 4.

At the uppermost point (when the crane is fully extended upwards such that the transmitter is about 60 ft above ground level), the measured UHRA and UHRP values may be taken to be approximately equal to homogeneous air values. This may be expressed mathematically, for example, as follows:

$$UHRA_{UP} \approx UHRA_{AIR}$$

$$UHRP_{UP} \approx UHRP_{AIR}$$

Tool calibration involves correcting tool measurements, for example, as follows:

$$UHRA_{CAL} = UHRA_{MEAS} + \Delta UHRA$$

$$UHRP_{CAL} = UHRP_{MEAS} + \Delta UHRP$$

where the calibration shifts ΔUHRA and ΔUHRP may be defined as follows:

$$\Delta UHRA = -UHRA_{MEAS\_AIR} + UHRA_{MODEL\_AIR}$$

$$\Delta UHRP = -UHRP_{MEAS\_AIR} + UHRP_{MODEL\_AIR}$$

In this sense, the calibration shifts ΔUHRA and ΔUHRP may be thought of as corresponding to the difference between the real tool and the model (which may not take into account all features of the tool including certain mechanical or electrical deviations from the model). In this example, ΔUHRA and ΔUHRP may be obtained via conventional air hang tests (as in the second control) or via the inversion process disclosed herein.

FIGS. 5A, 5B, and 5C plot horizontal resistivity (in units of ohm·m) in grey scale as a function of true vertical depth (TVD) in units of feet (with zero feet representing the surface of the earth, negative TVD being above the surface, and positive TVD being below the surface). Each grey-scale column corresponds to the inversion result for the given position of the transmitter indicated by the '*' symbol in these figures. The far right column represents the actual formation resistivity. The resistivity values below the '*' symbols represent look ahead resistivity values, while those above the '*' symbols represent look around resistivity values.

In the first control depicted on FIG. 5A (in which there is no calibration), the inversion result is clearly incorrect indicating a highly conductive formation a few feet ahead of the transmitter at 202. The boundary of this conductive region remains ahead of the tool as it is lowered towards the ground. In the second control depicted on FIG. 5B (in which the uppermost measurements were used as an air calibration), the inversion is improved. The surface is first observed when the tool is about 20-25 feet above the ground at 204. However, the surface location is computed to be about 10 feet below true ground level. Moreover, the initial resistivity values are underestimated as compared with the true resistivity of the earth. As the tool is lowered closer to the surface (e.g., to about 10-15 feet as indicated at 206, the inverted location of the surface is close to the true ground level and the inverted resistivity values are closer to the correct values.

In the comparison depicted on FIG. 5C (in which the calibration parameters are obtained via inversion as described above with respect to FIGS. 3 and 4) the inversion is significantly improved. The surface of the earth is detected earlier (higher up) at about 35 feet above the ground at 212. Moreover, the inverted resistivity values are close to the true values and even indicate a slightly more resistive layer at the top of the earth formation at 214. This resistive layer is presumably the result of a dry surface layer.

Figure 6:
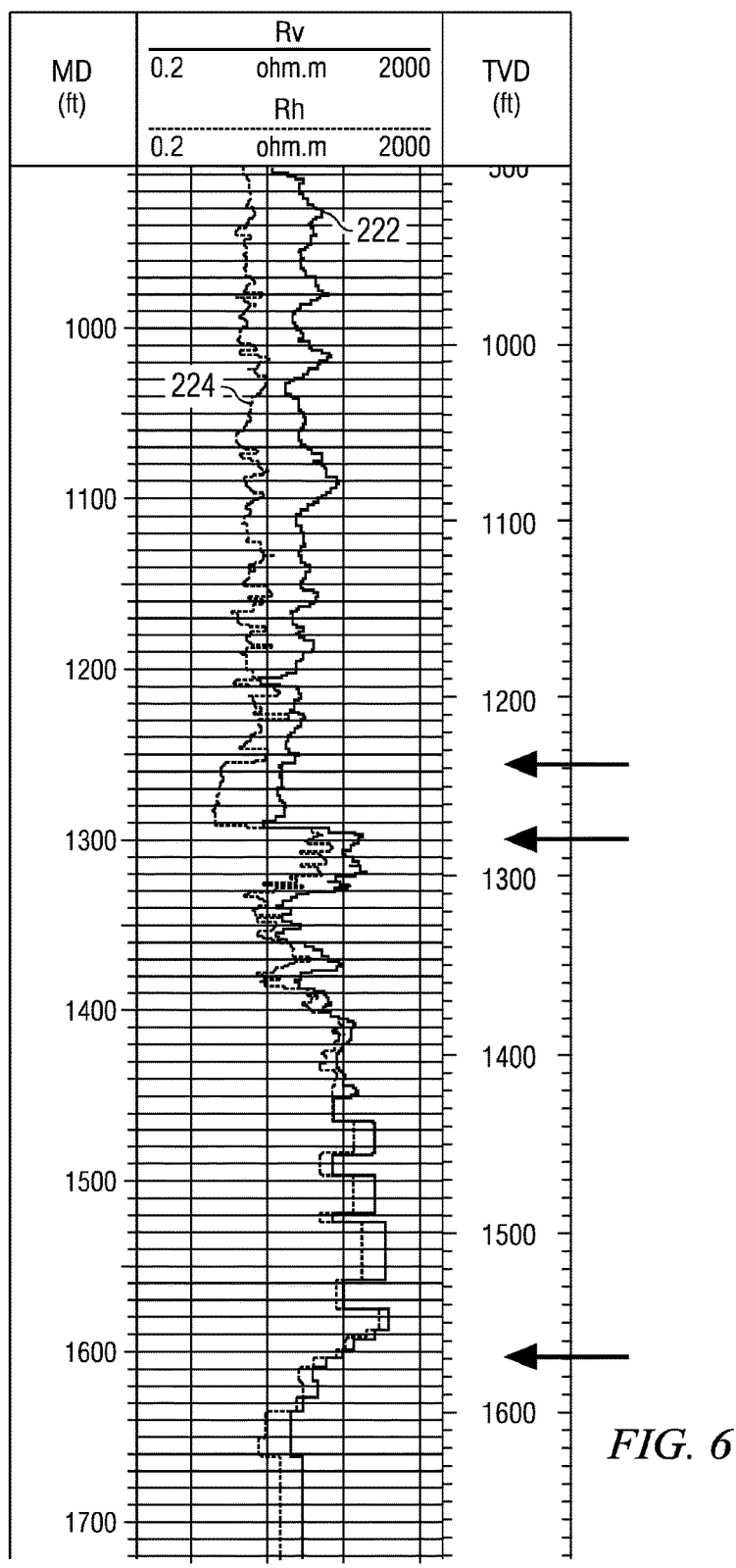
FIG. 6 depicts a resistivity log for an example formation.

FIG. 6 depicts a resistivity log for an example formation that is used as a further example in Table 1 and FIGS. 7A-7D and 8A-8D which are described in more detail below. In the resistivity log depicted on FIG. 6, vertical 222 and horizontal 224 resistivity are plotted as a function of true vertical depth (from about 900 to about 1700 feet). An inversion was processed using the method described above with respect to FIG. 4 to solve for 18 total calibration parameters and various formation parameters. The inverted calibration parameters included UHRA and UHRP calibration parameters at first, second, third, fourth, fifth, and sixth frequencies for a first measurement array (R1) and UHRA and UHRP calibration parameters at the first, second, and third frequencies for a second measurement array (R2). The inverted calibration parameters are shown in the first and fourth rows of Table 1.

The formation model used in the inversion was then used to generate synthetic resistivity data in order to test the inverted calibration parameters. The synthetic data (including realistic noise) was then shifted by the inverted calibration parameters to generate synthetic pre-calibrated resistivity data. This synthetic pre-calibrated resistivity data was then inverted using the method described above with respect to FIG. 4 to solve for the same 18 calibration parameters and formation parameters. These recomputed calibration parameters are shown in the second and fifth rows of Table 1. This second inversion restored all of the UHRA calibration parameters to a precision of less than 0.1 dB and all of the UHRP shifts to a precision of less than 0.5 degrees. The differences between the applied shift and the recomputed calibration parameters are shown in the third and sixth rows of Table 1. Such restoration indicates that the inversion-based calibration method disclosed herein is both robust and accurate.

TABLE 1

|  | R1 (f1) | R1 (f2) | R1 (f3) | R1 (f4) | R1 (f5) | R1 (f6) | R2 (f1) | R2 (f2) | R2 (f3) |
| --- | --- | --- | --- | --- | --- | --- | --- | --- | --- |
| ΔUHRA (applied), dB | 2.51 | 2.21 | 2.17 | 2.27 | 2.18 | 2.16 | 2.51 | 2.21 | 2.17 |
| ΔUHRA (solved), dB | 2.50 | 2.19 | 2.13 | 2.22 | 2.12 | 2.08 | 2.49 | 2.16 | 2.08 |
| UHRA difference, dB | 0.01 | 0.02 | 0.04 | 0.05 | 0.06 | 0.08 | 0.02 | 0.05 | 0.09 |
| ΔUHRP (applied), deg | −1.68 | −1.62 | −0.17 | −1.55 | −2.02 | −2.35 | −1.68 | −1.62 | −0.17 |
| ΔUHRP (solved), deg | −1.77 | −1.79 | −0.32 | −1.70 | −2.20 | −2.50 | −1.82 | −2.04 | −0.51 |
| UHRP difference, deg | 0.09 | 0.17 | 0.15 | 0.15 | 0.18 | 0.15 | 0.14 | 0.42 | 0.34 |

FIGS. 7A, 7B, 7C, and 7D plot horizontal resistivity (in units of ohm·m) in grey scale as a function of true vertical depth (TVD) in units of feet (with zero feet representing the upper surface of reservoir 232). Each grey-scale column corresponds to the inversion result for the given position of the transmitter indicated by the '*' symbol in these figures. In each plot, the true formation resistivity is shown in the far right column (next to the grey scale). The high resistivity reservoir shown at 232 is also indicated in the resistivity log (between the arrows) on FIG. 6. The resistivity data above the '*' symbols represent 'look-around' resistivity values, while the data below the '*' symbols represent 'look-ahead' resistivity values.

Figure 7A:
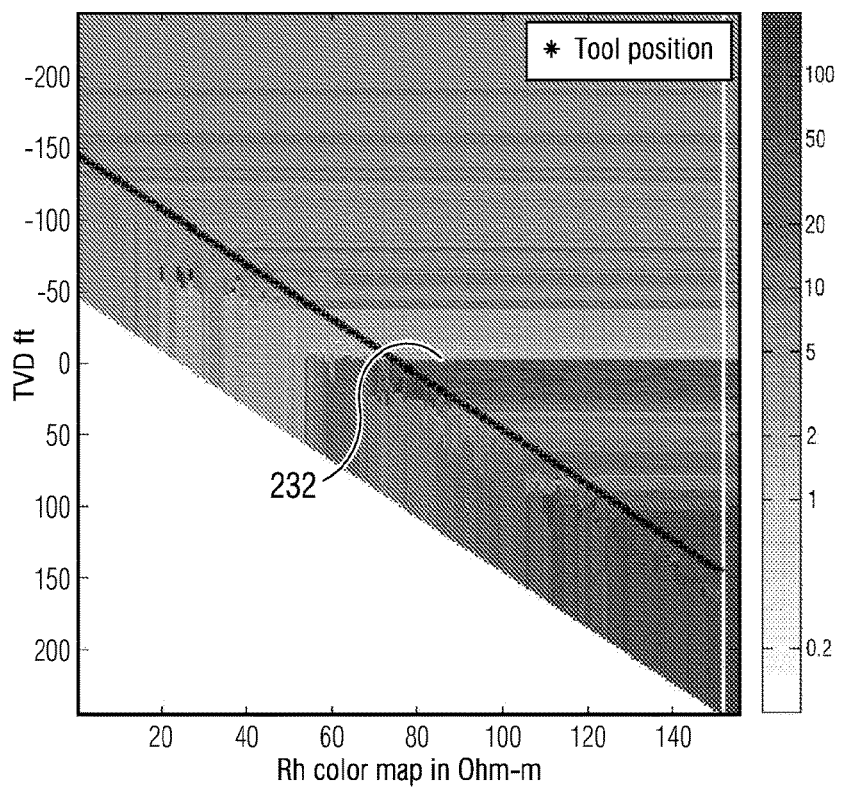
FIGS. 7A, 7B, 7C, and 7D depict resistivity maps for an experimental test in which a deep reading look-ahead resistivity tool is deployed in subterranean borehole. The maps depicted on FIGS. 7A and 7C were generated using synthetic data needing no calibration. The maps depicted on FIGS. 7B and 7D were generated using the inversion calibration methods described herein with respect to FIGS. 3 and 4 and a first portion of the log data shown on FIG. 6.
Figure 7B:
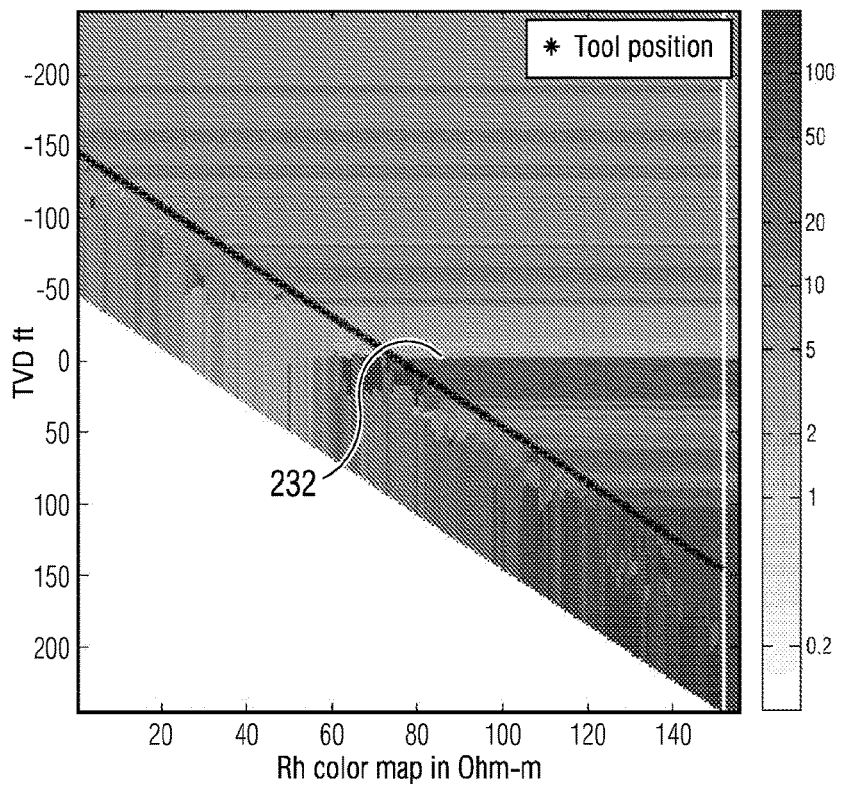
Figure 7C:
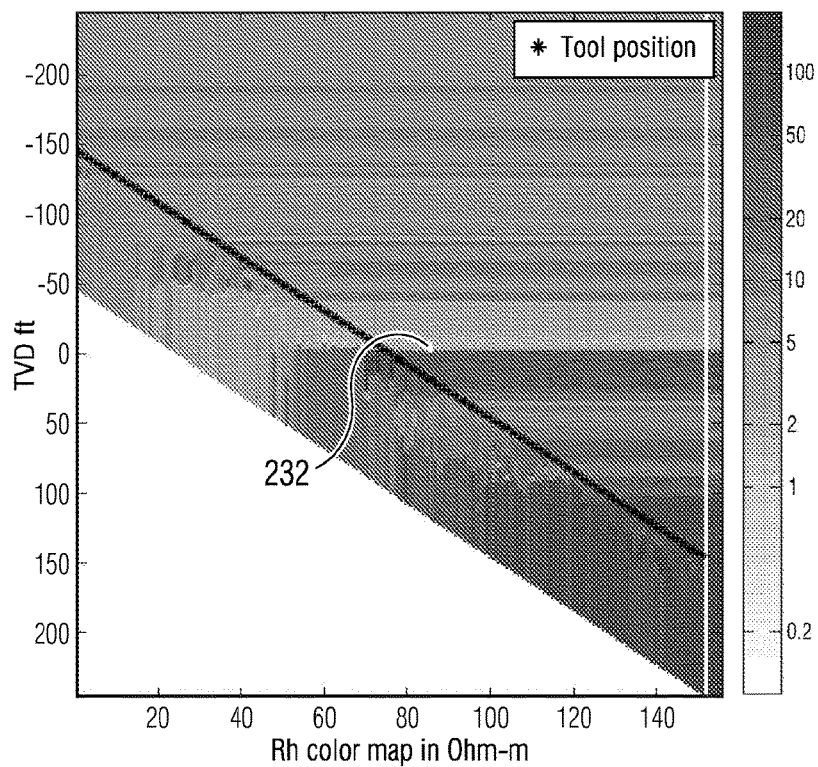
Figure 7D:
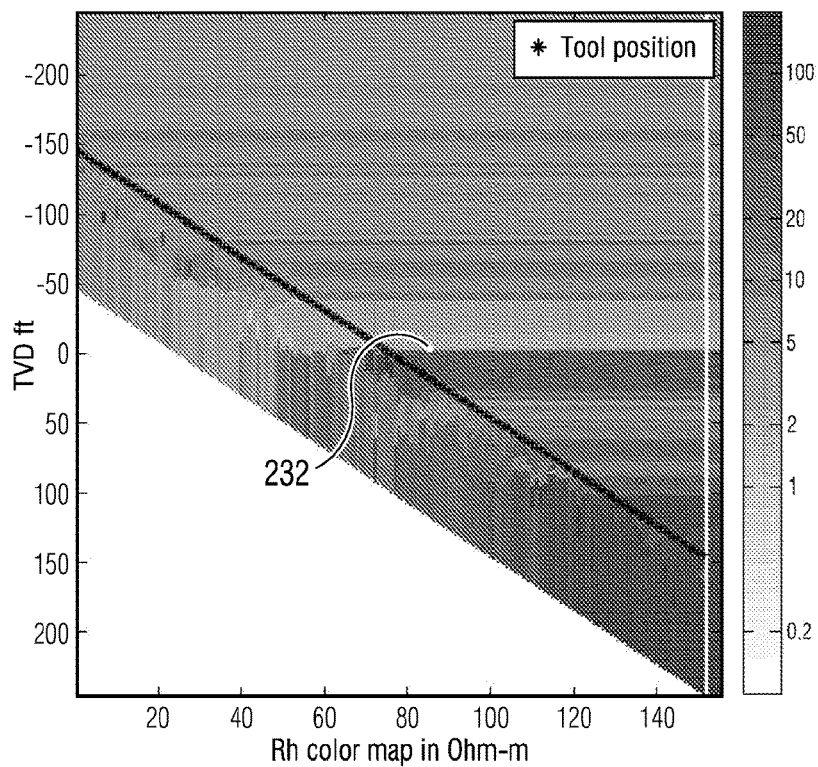

The plots depicted on FIGS. 7A and 7C were generated using the synthetic data that was used to test the inverted calibration parameters in Table 1. The resistivity values shown on FIG. 7A were generated using the first measurement array (R1—having a spacing of about 35 feet), while the data generated in FIG. 7C were generated using the first and second measurement arrays (R1 and R2—having spacings of about 35 and 70 feet, respectively). The plots depicted on FIGS. 7A and 7C represent a best case scenario in which no tool calibration is required. The plots depicted on FIGS. 7B and 7D were generated using the inversion calibration methods described above with respect to FIGS. 3 and 4 and the log data shown on FIG. 6. The look-ahead resistivity values shown on FIGS. 7B and 7D indicate that the calibration-based inversion methods disclosed herein enable the reservoir 232 to be readily detected when the transmitter is on the order of 30 to 50 feet above the reservoir 232. The inversion calibration methods also enable accurate reservoir resistivity values to be obtained.

FIGS. 8A, 8B, 8C, and 8D are similar to FIGS. 7A-7D in that they plot horizontal resistivity (in units of ohm·m) in grey scale as a function of true vertical depth (TVD) in units of feet (from 50 to 450 feet—with zero feet representing the upper surface of reservoir 232 shown on FIGS. 6 and 7A-7D). Each grey-scale column corresponds to the inversion result for the given position of the tool indicated by the '*' symbol in the FIGS. In each plot, the true formation resistivity is shown in the far right column (next to the grey scale). A low resistivity formation 234 below reservoir 236 is also depicted on FIG. 6 (below the single lower arrow). As in FIGS. 7A-7D the resistivity data above the '*' symbols represent 'look-around' resistivity values, while the data below the '*' symbols represent 'look-ahead' resistivity values.

Figure 8A:
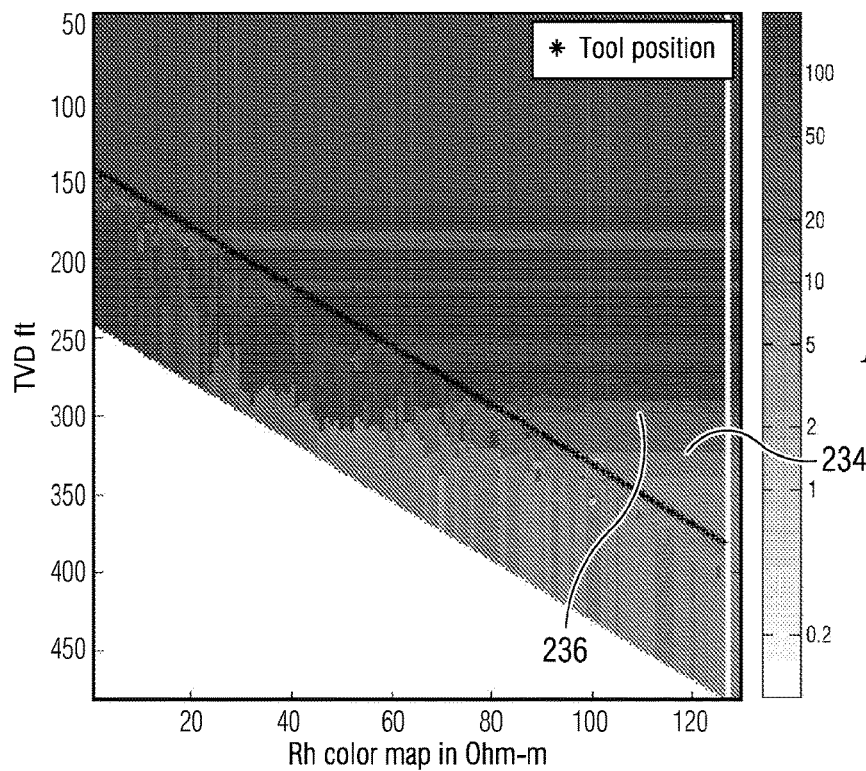
FIGS. 8A, 8B, 8C, and 8D depict resistivity maps for an experimental test in which a deep reading look-ahead resistivity tool is deployed in subterranean borehole. The maps depicted on FIGS. 8A and 8C were generated using synthetic data needing no calibration. The maps depicted on FIGS. 8B and 8D were generated using the inversion calibration methods described herein with respect to FIGS. 3 and 4 and a second portion of the log data shown on FIG. 6.
Figure 8B:
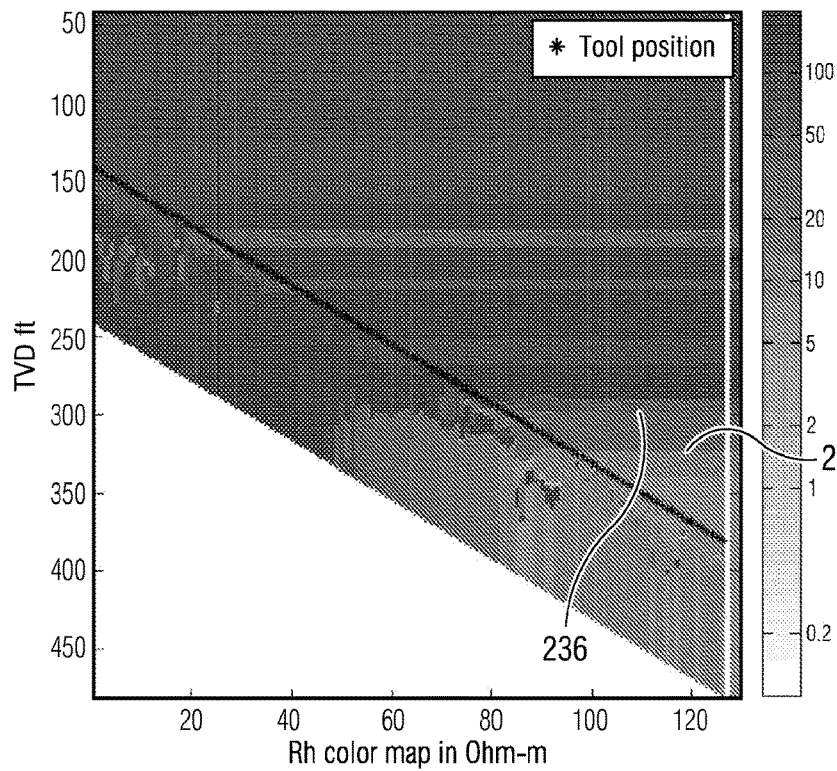
Figure 8C:
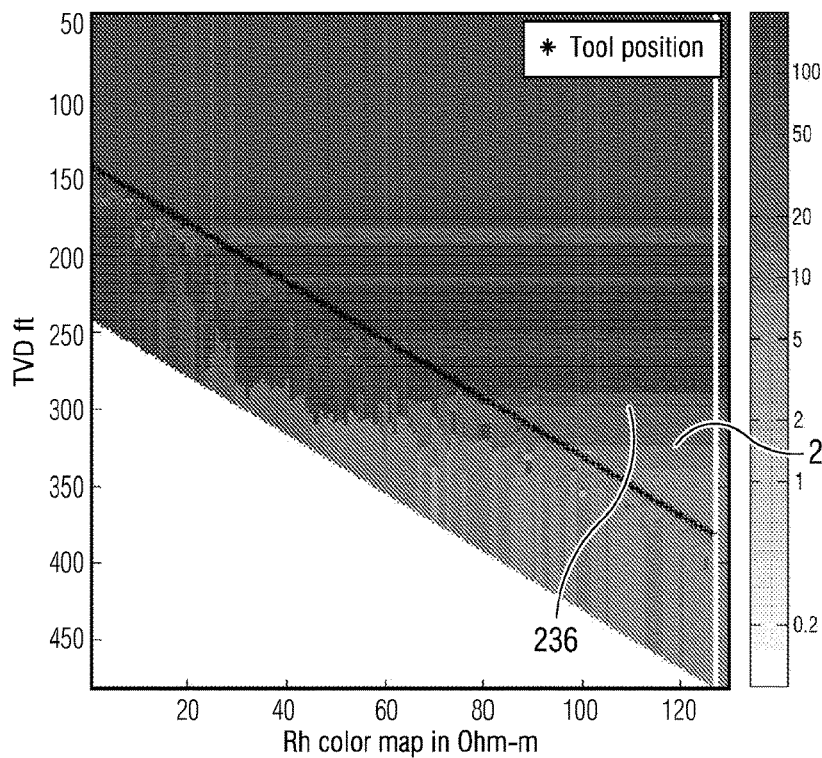
Figure 8D:
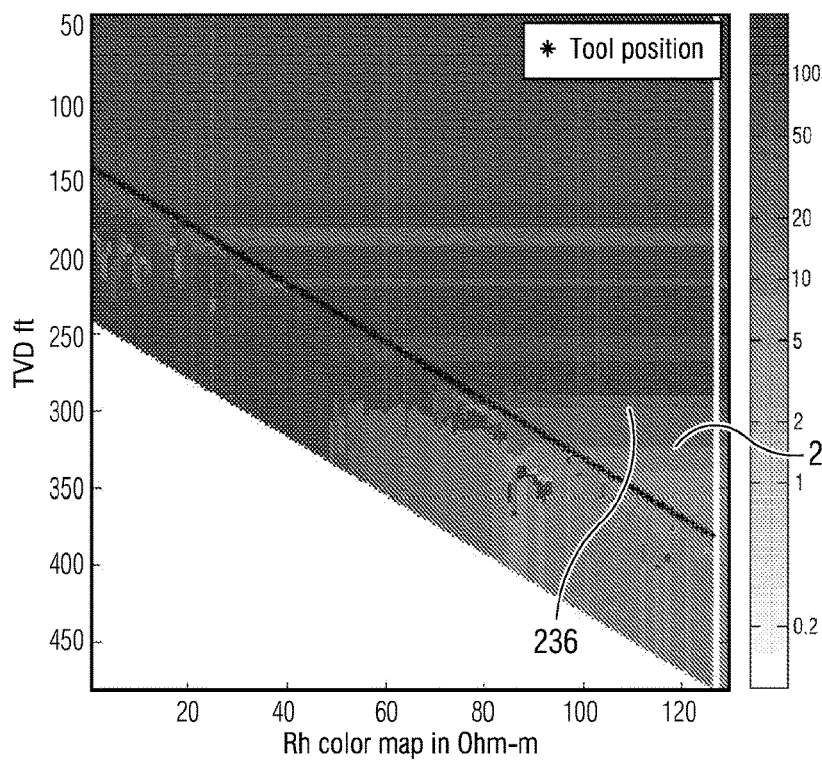

The plots depicted on FIGS. 8A and 8C were generated using the synthetic data that was used to test the inverted calibration parameters in Table 1. The resistivity values shown on FIG. 8A were generated using the first measurement array (R1—having a spacing of about 35 feet), while the data generated in FIG. 8C were generated using the first and second measurement arrays (R1 and R2—having spacings of about 35 and 70 feet, respectively). The plots depicted on FIGS. 8A and 8C represent a best case scenario in which no tool calibration is required. The plots depicted on FIGS. 8B and 8D were generated using the inversion calibration methods described above with respect to FIGS. 3 and 4 and the log data shown on FIG. 6. The look-ahead resistivity values shown on FIGS. 8B and 8D indicate that the calibration-based inversion methods disclosed herein enable the low resistivity formation 234 at the underside of reservoir 236 to be readily detected when the transmitter is on the order of 50 feet above the bottom of the reservoir 236. The inversion calibration methods also enable accurate resistivity values to be obtained for the formation below the reservoir 236.

The examples above indicate that the inversion calibration methods disclosed herein provide a viable calibration option for the calibration of LWD electromagnetic tools. These methods may advantageously be applied to substantially any electromagnetic measurement system. Moreover, the measurement tools may be advantageously recalibrated at substantially any time during an electromagnetic logging operation and, as described above, may be done without removing the tool from the subterranean environment. For example, such re-calibration may be useful if the average level of resistivity changes, e.g., when the tool enters the highly-resistive area in which the higher-frequency measurements become more sensitive.

It will be understood that the inversion calibration methods disclosed herein are generally implemented on a computer system. Specifically, in describing the functions, methods, and/or steps that can be performed in accordance with the disclosed embodiments, any and/or all of these functions may be performed using an automated or computerized process. As will be appreciated by those of ordinary skill in the art, the systems, methods, and procedures described herein can be embodied in a programmable computer, computer executable software, or digital circuitry. The software can be stored on computer readable media, such as non-transitory computer readable media. For example, computer readable media can include a floppy disk, RAM, ROM, hard disk, removable media, solid-state (e.g., flash) memory, memory stick, optical media, magneto-optical media, CD-ROM, etc. Digital circuitry can include integrated circuits, gate arrays, building block logic, field programmable gate arrays (FPGA), microprocessors, ASICs, SOCs, etc. The disclosed embodiments are in no way limited in regards to any particular computer hardware and/or software arrangement.

Although inversion-based calibration methods for downhole electromagnetic tools and certain advantages thereof have been described in detail, it should be understood that various changes, substitutions and alternations can be made herein without departing from the spirit and scope of the disclosure as defined by the appended claims.

What is claimed is:

1. A method for calibrating a downhole electromagnetic measurement tool, the method comprising:
    (a) acquiring electromagnetic measurement data in a subterranean borehole using a measurement array; and
    (b) causing a processor to process the electromagnetic measurement data acquired in (a) to obtain formation parameters and calibration parameters for the measurement array wherein said processing in (b) comprises processing an inversion of a formation model to obtain the formation parameters and calibration parameters for the measurement array;
    (c) fixing the calibration parameters for the first measurement array in the formation model; and
    (d) causing the processor to reprocess the electromagnetic measurement data acquired (a) and the calibration parameters fixed in (c) to obtain the formation parameters, wherein said processing in (d) comprises processing an inversion of the formation model with said fixed calibration parameters.

2. The method of claim 1, wherein the electromagnetic measurement data is acquired in (a) in a region of the subterranean borehole having substantially homogeneous electromagnetic properties.

3. The method of claim 1, wherein the electromagnetic measurement data acquired in (a) comprises deep reading resistivity data.

4. The method of claim 3, wherein the electromagnetic measurement data acquired in (a) further comprises shallow reading resistivity data.

5. The method of claim 3, wherein the deep reading resistivity data is collected at a plurality of frequencies and at least one calibration parameter is obtained in (b) for each of the plurality of frequencies.

6. The method of claim 1, wherein the calibration parameters comprise at least one calibration shift to a harmonic resistivity amplitude and at least one calibration shift to a harmonic resistivity phase.

7. The method of claim 1, wherein the electromagnetic measurement data is collected at a plurality of frequencies and the calibration parameters comprise a calibration shift to a harmonic resistivity amplitude at each of the plurality of frequencies and a calibration shift to a harmonic resistivity phase at each of the plurality of frequencies.

8. The method of claim 1, wherein the electromagnetic measurement data is acquired by first and second measurement arrays and the inversion processed in (b) obtains calibration parameters for each of the first and second measurement arrays.

9. The method of claim 1, wherein the formation parameters obtained in (b) and (d) comprise at least one of a near bed resistivity, a distance to one or more boundary layers, vertical and horizontal resistivities of one or more layers, an anisotropy ratio, and a dip angle of one or more boundary layers.

10. A method for calibrating a downhole electromagnetic measurement tool, the method comprising:
(a) acquiring electromagnetic measurement data in a subterranean borehole using first and second measurement arrays;
(b) processing the electromagnetic measurement data acquired in (a) using the first measurement array to obtain formation parameters and calibration parameters for the first measurement array, wherein the processing in (b) comprises processing an inversion of a formation model to obtain the formation parameters and calibration parameters for the first measurement array;
(c) fixing the calibration parameters for the first measurement array in the formation model; and
(d) processing (i) the electromagnetic measurement data acquired in (a) using the first and second measurement arrays and (ii) the calibration parameters fixed in (c) for the first measurement array to obtain the formation parameters and calibration parameters for the second measurement array, wherein the processing in (d) comprises processing an inversion of the formation model to obtain the formation parameters and calibration parameters for the second measurement array.

11. The method of claim 10, further comprising:
(e) fixing the calibration parameters for the second measurement array in the formation model; and
(f) processing (i) the electromagnetic measurement data acquired in (a) using the first and second measurement arrays and (ii) the calibration parameters fixed in (c) and (e) to obtain the formation parameters, wherein the processing in (f) comprises processing an inversion of the formation model to obtain the formation parameters.

12. The method of claim 10, wherein (a) further comprises acquiring electromagnetic measurement data in the subterranean borehole from the first and the second measurement arrays, and a third measurement array and the method further comprises:
(e) fixing the calibration parameters for the second measurement array in the formation model; and
(f) processing (i) the electromagnetic measurement data acquired in (a) using the first, second, and third measurement arrays and (ii) the calibration parameters fixed in (c) and (e) to obtain the formation parameters and calibration parameters for the third measurement array, wherein the processing in (f) comprises processing an inversion of the formation model to obtain the formation parameters and the calibration parameters for the third measurement array.

13. The method of claim 10, wherein the first measurement array comprises at least one transmitter-receiver antenna pair having a first axial spacing, and wherein the second measurement array comprises at least one transmitter-receiver antenna pair having a second axial spacing, wherein the first axial spacing is shorter than the second axial spacing.

* * * * *